United States Patent [19]

Musachio

[11] Patent Number: 5,134,254
[45] Date of Patent: Jul. 28, 1992

[54] ELECTRICAL VEHICLE TRANSPORTATION SYSTEM

[76] Inventor: Nicholas R. Musachio, 862 W. Iowa, St. Paul, Minn. 55117

[21] Appl. No.: 800,448

[22] Filed: Nov. 26, 1991

Related U.S. Application Data

[63] Continuation-in-part of Ser. No. 714,457, Jun. 13, 1991, which is a continuation-in-part of Ser. No. 383,036, Jul. 20, 1989, Pat. No. 5,045,646.

[51] Int. Cl.$^5$ .................................................. B60L 9/00
[52] U.S. Cl. ............................................ 191/6; 191/18; 180/2.1
[58] Field of Search ............... 191/6, 18, 2, 3, 4, 191/8, 14, 15, 17, 29 DM, 47; 180/2.1

[56] References Cited

U.S. PATENT DOCUMENTS

| | | | |
|---|---|---|---|
| 1,859,343 | 5/1932 | Rouge | 191/49 |
| 3,637,956 | 1/1972 | Blackman | 191/4 |
| 4,057,753 | 11/1977 | Perry et al. | 318/376 |
| 4,129,203 | 12/1978 | Berman | 191/48 |
| 4,139,071 | 2/1979 | Tackette | 180/2 |
| 4,476,947 | 10/1984 | Rynbrandt | 180/2.1 |
| 4,836,344 | 6/1989 | Bolger | 191/10 |
| 4,892,980 | 1/1990 | Riley | 191/14 |
| 4,984,349 | 1/1991 | Ohta et al. | 191/8 X |
| 5,056,646 | 9/1991 | Musachio | 191/18 X |

FOREIGN PATENT DOCUMENTS 2504061  8/1976  Fed. Rep. of Germany ........ 191/18

Primary Examiner—Frank E. Werner
Assistant Examiner—Scott L. Lowe
Attorney, Agent, or Firm—Kinney and Lange

[57] ABSTRACT

A transportation system for use with a roadway including conductive sections on the roadway so that electric vehicles having contact members thereon may contact the conductive sections. The sections extend in the direction of travel along the roadway and have spaces therebetween to prevent short circuiting by the contact members. Alternate sections are connected continuously to a reference voltage and the remaining sections are each connected through a switching device to a source of power when the vehicle is proximate thereto power.

9 Claims, 7 Drawing Sheets

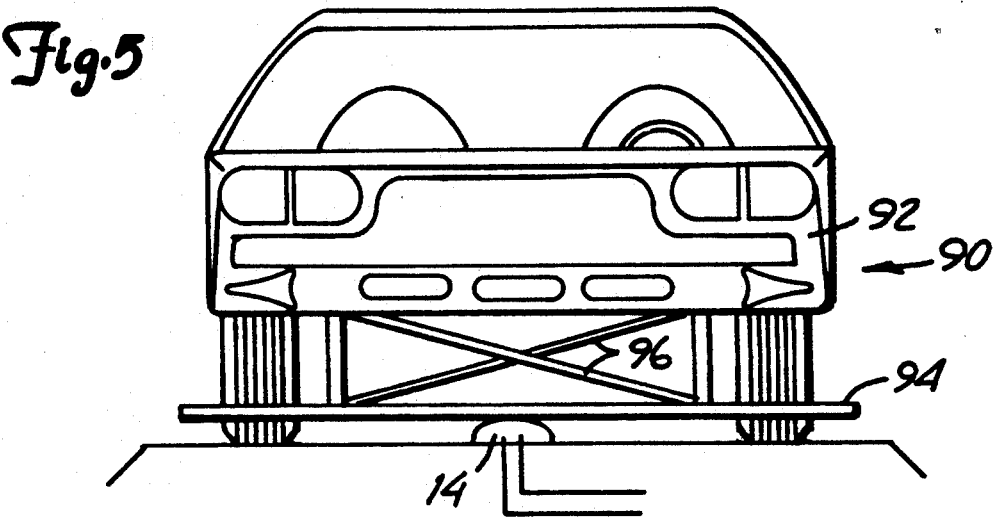
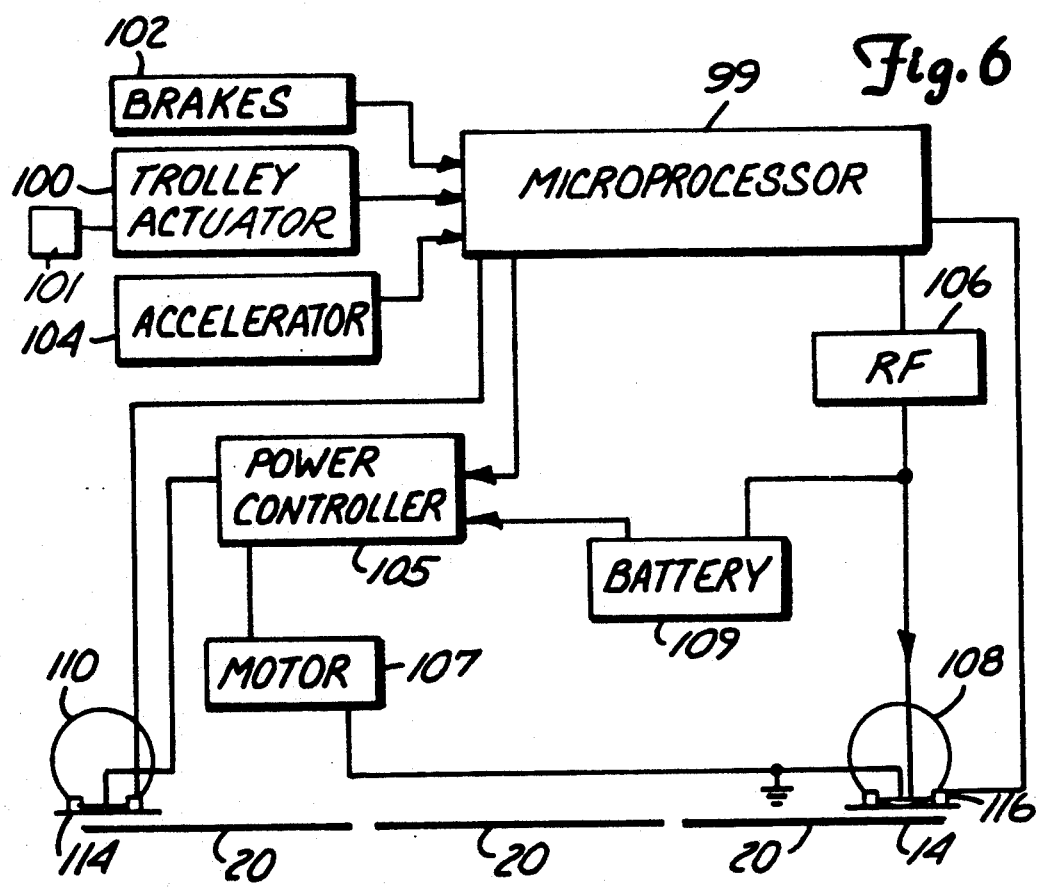

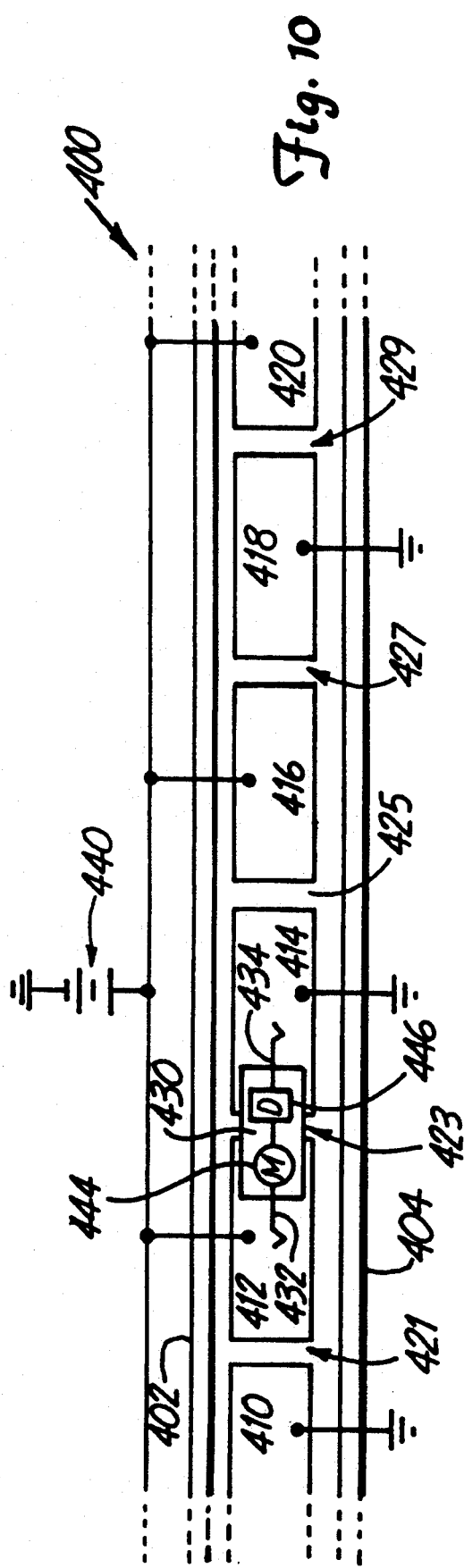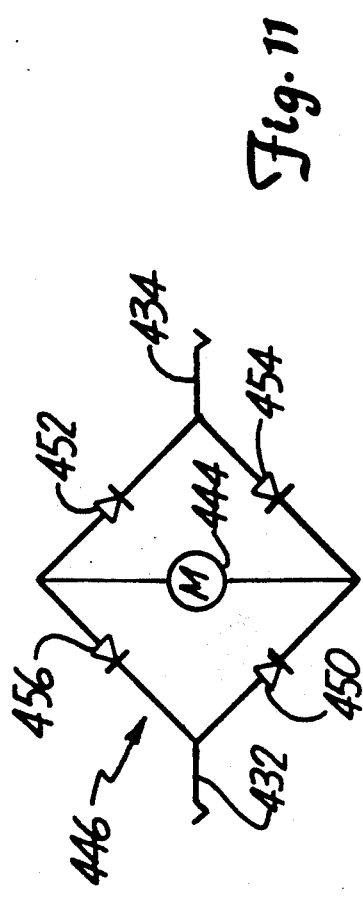

ELECTRICAL VEHICLE TRANSPORTATION SYSTEM

This application is a continuation-in-part of application Ser. No. 07/714,457 filed Jun. 13, 1991 which is a continuation-in-part of application Ser. No. 07/383,036, Jul. 20, 1989 now U.S. Pat. No. 5,045,646, issued Sep. 3, 1991.

FIELD OF THE INVENTION

The invention relates to electrical transportation systems providing an external power source for vehicles.

BACKGROUND OF THE INVENTION

Electrically-powered vehicles have a long history. Electrically-powered pantograph trains are used for commuter passenger trains along heavily traveled routes on the east coast of the United States and in the Chicago metropolitan area. Subways and other light rail systems routinely use electrified third-rail systems. Electrically-powered automobiles and delivery vans are in use around major cities. Electrically powered golf carts, fork lift trucks and other such specialized vehicles also exist.

Electrical power offers numerous benefits as an energy source in transportation. In railroad locomotives, electric motors offer excellent low end torque, reliability and ease of maintenance. Diesel-electric locomotives use diesel engines to turn generators, which in turn supply electrical power to drive electric traction motors in order to gain these advantages. Still other advantages can be gained by the use of purely electric-powered vehicles. Examples of such advantages include reduced pollution output, reduced mechanical complexity and, where the electrical power source is external, reduced weight.

Unfortunately, providing adequate electrical power to vehicles has proven difficult, expensive, or inconvenient, or all three of the above depending upon the application. Pure electrically-powered vehicles have conventionally used one of two sources of electrical power, on-board batteries or external sources such as trolleys. Batteries are inefficient stores of energy, particularly when compared to gasoline, which limit the relative range of vehicles using batteries. The batteries required by a vehicle for even limited ranges of 50 to 100 miles add considerably to the weight of the vehicle using them, adding inherent inefficiency to the vehicle. Providing external sources of power, such as trolley systems, has typically required a prohibitive capital investment and has limited the routing of vehicles.

Nonetheless, electrically powered transportation systems employing external power sources have been very successful where employed. Electrified rail systems have typically relied on external power. External electric power supplies such as overhead trolleys and third rail systems work well for railroads under certain conditions. However, overhead lines are extremely expensive and considered by many to be unsightly. In many environments overhead lines are exposed to possible damage from weather, accident and sabotage. Third rail systems work well but are inherently dangerous to pedestrians. None of these systems have proven economically viable for lightly traveled routes despite wide appreciation of the reduced pollution and reduced maintenance costs afforded by such systems.

Electrification of automobiles and other over the road motor vehicles has progressed even more slowly than in the railroad industry. In fact, electrification of automobiles has regressed since the beginning of the century when electric vehicles vied with internal combustion powered and external combustion powered vehicles for dominance on the highways. Practical electric automobiles have typically been supplied with energy from batteries. At best, batteries provide energy to travel about one hundred miles. The use of accessories such as heat, air conditioning, or headlights, greatly reduces even this limited range. The weight of the batteries themselves reduces the range, and space efficiency of automobiles so equipped. Frequent recharging of the batteries in such vehicles is unavoidable. In addition, many of the best batteries in terms of overall energy storage capability accept charging at a slow rate. This makes recharging a slow and tedious affair. Electrically-powered battery equipped automobiles have proven inconvenient compared to internal combustion powered motor vehicles.

Battery equipped vehicles compare very poorly in efficiency terms with electric vehicles energized by external electrical sources. For this reason numerous inventors have attempted to develop systems for delivering electrical power to over the road vehicles. Such systems have typically had the disadvantages of high initial capital cost, plus the additional handicap of overly limiting the maneuverability of the vehicles so powered. With the exception of trolley buses, practical electrically-powered motor vehicles have carried a heavy load of storage batteries as a power source. Guidance control of the trolley has also complicated use of external electrical power in cars.

U.S. Pat. No. 1,859,343, teaches an electric vehicle having electrically conductive tires. The conductive tires contact a series of conductors embedded in a roadway to complete an electric circuit between the embedded conductors and an overhead line which is engaged by a trolley. While this system allows limited maneuverability, it has the same basic limitations of any overhead trolley system.

U.S. Pat. No. 4,139,071 provides an electrified traffic lane having at least two spaced parallel contact assemblies mounted with their top surfaces flush with the road on each side of the vehicle. The contact assemblies each require a predetermined weight thereon to maintain electrical contact with the vehicle wheels. The vehicle employs electrically-conductive tires which are the pickup contact with the conductors for energization of electrical motors within the vehicle. This system presents a safety hazard to potential foot traffic along the roadway in that the system can be energized by any adequate weight and remains energized when a stationary weight is on a roadway electrical contact assembly.

U.S. Pat. No. 4,476,947 attempted to answer these difficulties. More particularly, the patent proposed a system directed to electrification of roadways and which provided vehicles adapted to receive power from such roadways for motive power and for recharging a minimal battery pack for powering the vehicle for off electrified roadway operation.

The patent proposes an electrified roadway which includes sets of paired, parallel, sectioned power rails. Each pair of power rails is aligned with a traffic lane of the roadway. Sections of each pair correspond to one another. Corresponding sections are energized with opposite polarity D.C. power according to the presence of a vehicle and demand by the vehicle for power. Vehicles are provided with a pair of trolleys, aligned perpendicular to the direction of movement of the vehicle. A powered guidance mechanism is provided for maintaining trolley tracking of the power rails.

SUMMARY OF THE INVENTION

The present invention is directed to an improved electrified transportation system providing substantially continuous, externally sourced electrical power to electrically-powered vehicles. A single power rail provides both electrical power and a return path to passing vehicles in contact with the rail. The power rail comprises a plurality of conductive rail segments, linearly aligned with one another and parallel to the direction of travel of motor vehicles along a motor vehicle route. Rail segment controllers supply power to selected rail segments upon demand by a passing vehicle. Conductive rail segments not receiving power are preferably grounded, or connected to the opposite polarity terminal of the power source.

Each vehicle has a pair of trolleys for making electrical contact with the power rail. The trolleys are substantially longitudinally aligned in the direction of movement of the vehicle and are brought in alignment with the power rail by bracketing the rail with the motor vehicle. The trolleys are spaced to insure electrical contact with different conductive rail segments of the power rail. A return trolley, typically the leading trolley in terms of movement of the motor vehicle, is in electrical contact with one or two conductive rail segments of the power rail at any given instant. This provides a ground return contact. The trailing trolley, or power trolley, is spaced from the ground contact to make electrical contact with a set of one or two rail segments exclusive of the rail segments in contact with the ground trolley. This electrical contact is the power contact.

Electrical power is provided to a vehicle upon demand. Each vehicle transmits an actuation signal to controlling circuitry for the power rail to energize one or more adjacent conductive rail segments. The controlling circuitry connects rail segments either to a power bus or to ground. A convention respecting the trolley positioning on the vehicle and rail segment length assures that the vehicle's power trolley contacts hot rail segments and that the vehicle's ground return trolley contacts grounded rail segments. Rail segments are insulated from one another.

In roadway applications, trolley contact with the power rail is required for transmitting electrical power to each vehicle. Electrical contact must also be easily broken and reestablished to allow vehicles to easily leave and reenter trunk routes. The present invention provides two techniques of trolley positioning for electrical connection. The first technique provides a magnetically guided brush conductor directly aligned with a magnetic power rail. The second technique provides a vehicle wide brush or bar conductor for contacting the power rail upon simple bracketing of the power rail by a vehicle.

BRIEF DESCRIPTION OF THE DRAWINGS

FIG. 5 is a front view of a trolley for use with and electric vehicle.

FIG. 6 is a block diagram schematic of a control arrangement for an electric vehicle.

FIG. 10 is a further alternate embodiment of the present invention.

FIG. 11 is a schematic drawing of a unidirectional current flow device useful with the present invention.

DETAILED DESCRIPTION OF THE PREFERRED EMBODIMENTS

Figure 1:
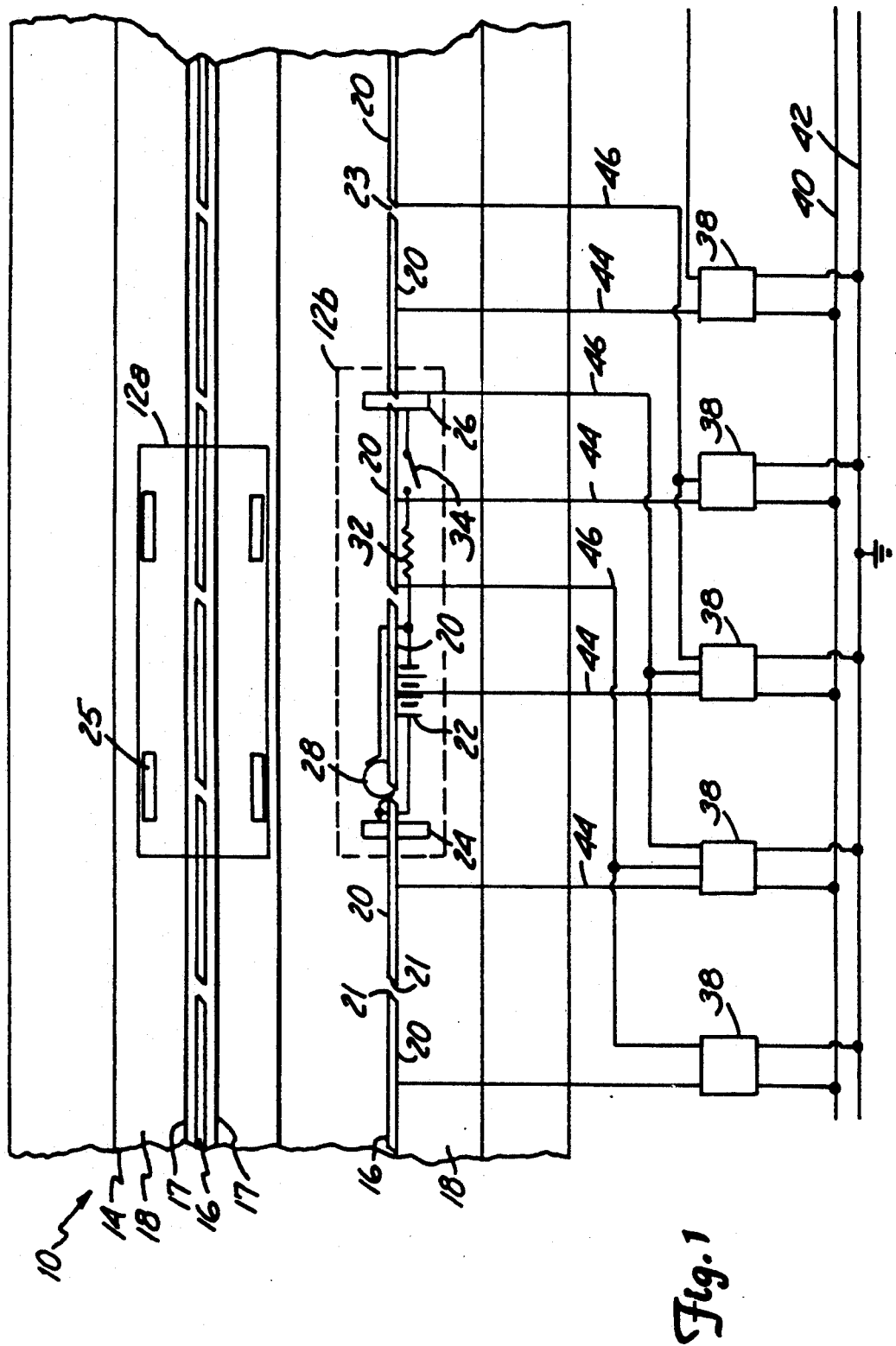
FIG. 1 is a top view and partial cross section of an electrified roadway.

The SHERT (Segmented, Hot, Electric, Rail, Transit) transportation system 10 of FIG. 1 provides an external power source for electrically-powered vehicles 12a and 12b on a multi-use, electrified roadway 14. Vehicle 12a illustrates the approximate alignment of a vehicle on roadway 14, while vehicle 12b is an equivalent circuit representation of such a vehicle. Electrified roadway 14 has a plurality of power rails 16, one of which is centered in each traffic lane 18. Each power rail 16 comprises a series of electrically conductive power rail segments or strips 20, which are aligned end to end to form the power rail. Electrically-powered vehicle 12b is in contact with at least two differing rail segments 20 of power rail 16 at any given moment, drawing power from one or two such rail segments while another, spaced rail segment or two provides a ground return.

Power rail segments 20 are shaped as parallelograms. Edges 21 between adjacent rail segments are canted with respect to the direction of alignment of the rail segments while being parallel to one another. Other power rail segment shapes are possible, the objective being continuous electrical contact between a trolley and power rail 16. In essence, a contact brush, elongated in a direction perpendicular to the direction of the rail, will come into electrical contact with each succeeding rail segment before it leaves its current rail segment (see, for example, current collector 26).

An insulating rail segment 23 electrically separates each power rail segment 20. Power rail segments 20, while normally grounded, are subject to selective energization through associated power switching controllers 38. Energization of individual power rail segments 20 is initiated by vehicle 12 as it moves along roadway 14. Each power rail 16 can be provided with adjacent drainage strips 17. Drainage strips 17 have conventional drainage pipes for preventing water from collecting over rail 16.

Each power rail segment 20 is connected to one power switching controller 38 by a power cable 44. In addition, each controller 38 is connected to a consecutive pair of different power rail segments 20 by actuation lines 46 from the respective pair of power rail segments. Application of an actuation signal to a power rail segment 20 results in transmission of the actuation signal to a consecutive pair of power switching controllers 38.

Upon receipt of an actuation signal, a controller 38 connects its respective associated power rail segments 20 to power bus 40. In one preferred embodiment bus 40 provides D.C. power. Where vehicles 12 are provided with rectifiers, inverters, and A.C. tractor motors, such as proposed in part by Ford Motor Company for its ETX-II vehicle (see Report of the Assistant Secretary for Conservation and Renewable Energy, Office of Transportation Systems, U.S. Dept. of Energy for March 1988), A.C. power may be provided from the bus. Absent application of the actuation signal, controllers 38 connect their respective power rail segments 20 to ground bus 42. When grounded, power rail segments 20 are safe for pedestrian traffic. A description of an example of a protocol defining conditions under which a vehicle 12 generates actuation signals and the nature of those signals, appears in U.S. Pat. No. 4,476,947. Those skilled in the art will realize that actuation signals could also be detected by controllers 38 from power cables 44. An opposite polarity power bus would be substituted for ground bus 42.

Actuation signals are applied to the power rail segment 20 currently providing the ground return for a passing vehicle 12a or 12b. Power rail segments 20 energized in response to the actuation signals are spaced by a constant interval from the ground return power rail segment 20. In the preferred embodiment, the energized rail segments 20 are a consecutive pair of rail segments spaced by an interval of one intervening non-energized rail segment 20 between the current ground return rail segment 20 and the closer energized rail segment 20. The interval can range from no intervening rail segments 20, provided the set of energized rail segments never overlaps the set of ground return rail segments, to a number greater than one intervening rail segment 20. Obviously, vehicle current collectors must be longitudinally spaced within certain predetermined minimum and maximum ranges, determined by the interval selected.

The parallelogram configuration of power rail segments 20 allows straddling of insulating rail segment 23 between power rail segments by current collectors 24 and 26. This prevents power interruption to the vehicles, such as could occur were a vehicle to stop with a current collector atop an insulating rail segment 23. Power rail segments 20 have ground fault interrupter type circuits to prevent short circuiting. Power rail segments 20 will be magnetically attractive where magnetically guided power and return trolleys are employed (as described below). Rail segments 20 may also be a slightly raised rail for contact with a simplified power collector system, as described below. Rail segments 20 may also have accompanying visual markings or radio signal transmission lines for trolley systems employing active guidance systems.

Vehicles 12a and 12b are hybrid vehicles. Referring primarily to the equivalent circuit representation 12b of the vehicle, vehicle 12b includes a battery 22 for travel off of electrified roadway 14 and current collectors (i.e. trolley) 24 and 26 for travel on the electrified roadway. Battery 22 can store energy sufficient to support minimum off electrified roadway movement, (e.g. up to 10 miles) and is recharged during periods when vehicle 12 is in contact with power rail 16. Vehicle 12 has two current collectors 24 and 26. Current collectors 24 and 26 are spaced to insure contact with a different power rail segment 20 during travel by vehicle 12 along roadway 14. The length of power rail segments 20 is standardized. Thus current collectors 24 and 26 must have a certain minimum spacing to avoid simultaneous contact with the same power rail segment. Vehicle 12 draws current through current collector 24 from an energized power rail segment 20 and returns the current to ground through current collector 26 to grounded power rail segment 20.

The equivalent circuit representation of vehicle 12b includes a traction motor (or motors) 28, battery 22, resistor 32 and switch 34. Battery 22 and traction motor 28 are connected in parallel between current collector 24 and one terminal of resistor 32. Switch 34 is connected in series between a second terminal of resistor 32 and current collector 26. Traction motor 28 drives a pair of wheels 25 of vehicle 12a in conventional manner. Battery 22 supports operation of vehicle 12b for brief periods when the vehicle is off of electrified roadway 14. Battery 22 is preferably recharged when vehicle 12 is drawing power from electrified roadway 14.

Figure 2:
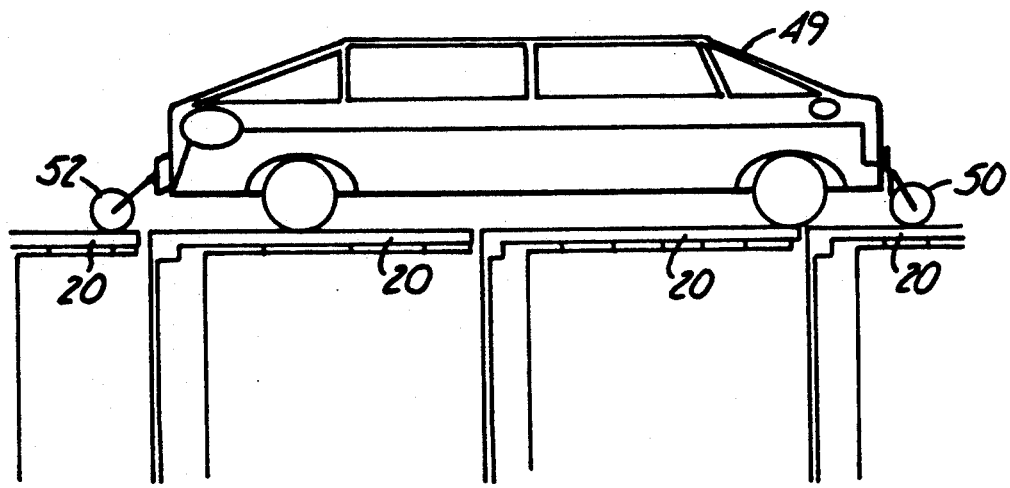
FIG. 2 is a side elevation of an electric vehicle according to one embodiment of the invention.
Figure 3:
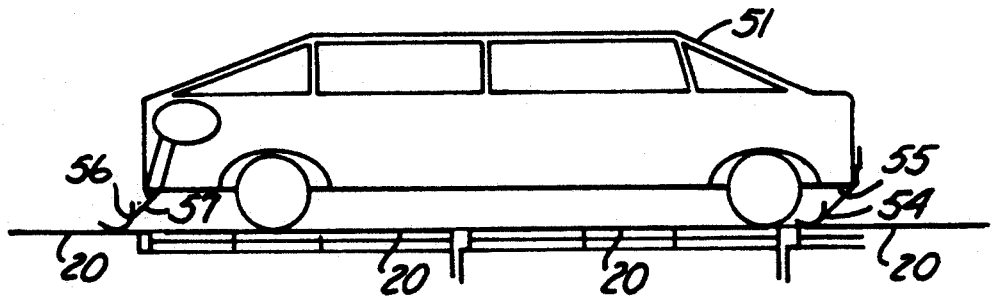
FIG. 3 is a side elevation of an electric vehicle according to a second embodiment of the invention.

FIGS. 2 and 3 illustrate alternative trolley systems for vehicle 12. Vehicle 49 has a magnetically guided, wheeled ground return trolley 50 mounted to the front end of the vehicle. A similar magnetically guided, wheeled power take up trolley 52 is mounted to the back of the vehicle. Vehicle 51 has a retractable, ground return contact 54, which spans the width of vehicle 51. Ground return contact 54 is attached to the vehicle near its front by a spring loaded strut 55, which gives upon encountering road debris. A similar, retractable, spring loaded power take contact 56 is attached to the rear of vehicle 51 by strut 57. Electrical contacts 54 and 56 can be bars or woven steel wool brushes.

Figure 4:
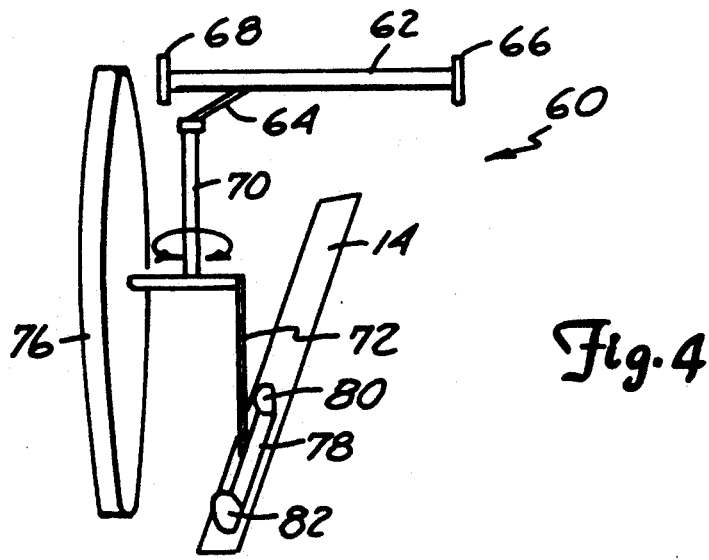
FIG. 4 is a perspective view of a trolley for use with an electric vehicle.

FIG. 4 illustrates in greater detail the magnetically guided trolley system of one embodiment of the invention. Trolley 60 is a magnetically guided trolley, actuated upon demand. Trolley 60 may be employed for either power take up or ground return. Trolley 60 is capable of lateral movement to compensate for corresponding lateral movement of the vehicle in a lane of traffic. Lateral displacement is allowed along slide bar 62 to which connector bar 64 is attached. Displacement of connector bar 64 is limited by stops 66 and 68, which are positioned at opposite ends of slide bar 62. Contact between connector bar 64 and either of stops 66 or 68 results in shut off of trolley 60. Connector bar 64 supports a swivel 70, which allows turning of a fork 72 in response to turning of a vehicle employing the trolley system. Most of the weight of trolley 60 is supported by a wheel 76, which fork 72 holds parallel to brush 78. Brush 78 is over power rail 14. Power rail 14 is made of a magnetic material, such as steel. Brush 78 is positioned at approximately road level by a tine of fork 72. Mounted with brush 78 are electromagnets 80 and 82, which may be actuated to create a magnetic field and thereby provide tracking between brush 78 and rail 14. Electromagnets 80 and 82 are turned off by contact between connector 64 and stops 66 and 68. The trolley guidance system may also be used to guide the electric vehicle, with a manual steering override system. Magnetic guidance can also be manually deactivated upon command of the operator of the electric vehicle.

FIG. 5 illustrates an alternative embodiment of a trolley 90 mounted to a vehicle 92. With a trolley 90, a raised power rail 14 is provided. Power rail 14 can be made of any conductive material, permitting selection of materials potentially less expensive than common magnetic materials, less prone to corrosion, or of superior electrical conductivity. A bar or woven steel brush 94 is supported in contact with rail 14 by a strut 96. Strut 96 is spring loaded to bias the contact bar 94 against rail 14. Strut 96 is hinged to give if road debris is encountered and is retractable for off powered roadway use of vehicle 92. Again two trolleys are provided for each vehicle, one for power take up and a second for a ground return.

In either embodiment, the ground return trolley contacts are used to send a radio frequency (RF) signal through the ground return power rail segment 20 to two power controllers 38 which energize power rail segments 20 spaced from the current ground return rail segment. When the vehicle incorporating the present system is moving, the appropriate rail segments 20 are energized before arrival of the power take up trolley. This provides a smooth transition between the power rail segments by the power take up trolley, and controls switch arcing that occurs in other systems such as third rail systems. Appropriate spacing of the trolleys results in energizing the appropriate power rail segments, in a manner such that a complete electrical circuit between power take up and ground return trolleys and the corresponding power rail segments is produced.

FIG. 6 is a block diagram schematically illustrating vehicle speed and trolley control for a vehicle using D.C. power. A microprocessor 99 is responsive to a trolley actuator 100, an accelerator 104 and brakes 102 for generating selected control signals for a power controller 105 and an RF generator 106.

Trolley actuation is provided by a manually operated switch 101 connected to trolley actuator 100. When active, electromagnets, if the vehicle is so equipped, are on and when brought over a magnetic power rail 14, provide sufficient attractive force to keep trolleys 108 and 110 tracking rail 14. If the vehicle moves outside of its lane, and breaks contact with rail 14 for greater than a certain minimum period t, trolley actuator 100 automatically turns off. The operator may also manually switch off both trolleys. Microprocessor 99 controls transmission of actuation signals to electromagnets 114 and 116. Electromagnets 114 and 116 may be on while no power is being drawn by the vehicle.

Brake actuation 102 or letting up on accelerator actuation 104 results in cutting off of the RF signal actuator 106, which otherwise provides the signal for transmission to the grounded trolley 108 and rail 14. Accelerator 104 provides a power demand indication to microprocessor 99 which in turn provides an appropriate control signal to power controller 105.

Power controller 105 controls power source switching to motor 107, allowing the motor to draw energization from either battery 109 or power take up trolley 110. Motor 107 is preferably a D.C. motor, and accordingly, its level of energization is easily controlled through power controller 105 as well.

Figure 7:
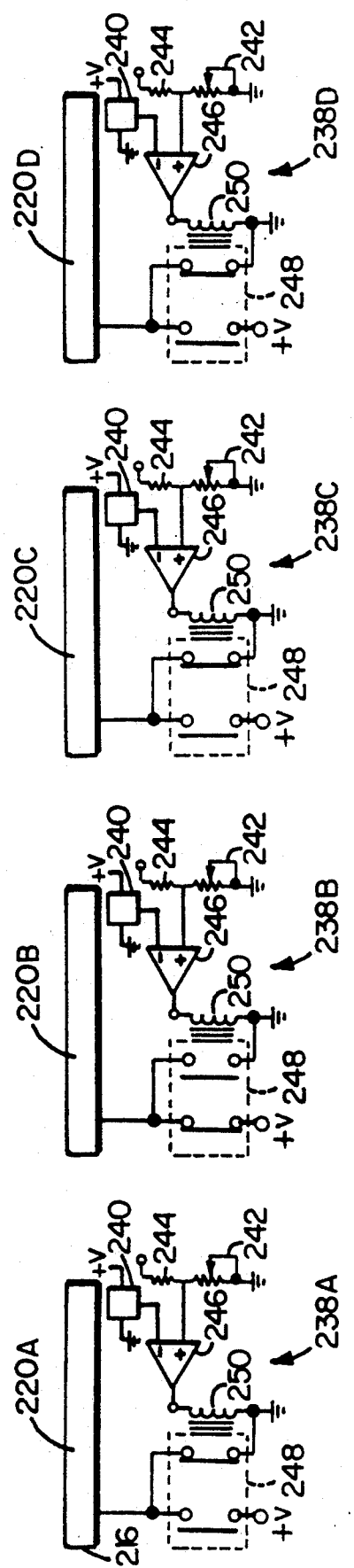
FIG. 7 is a circuit diagram for control an electrified roadway for a second embodiment of the invention.
Figure 8:
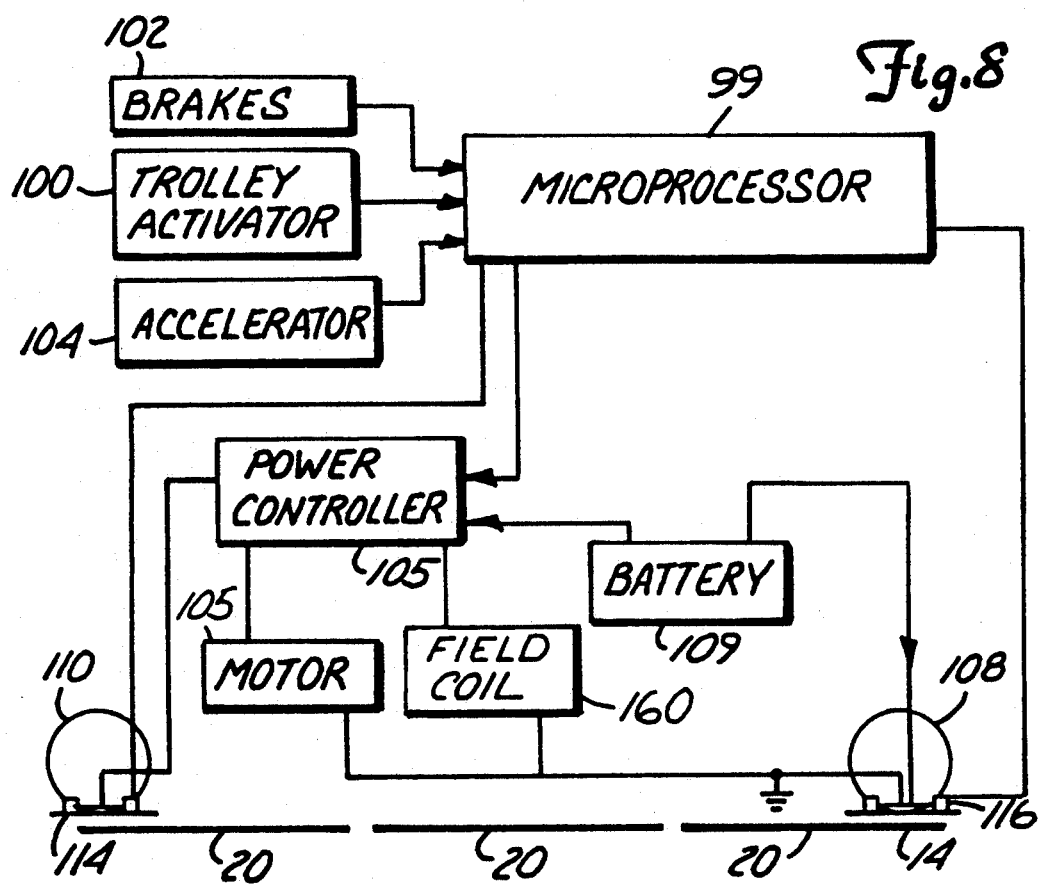
FIG. 8 is a block diagram schematic of a control arrangement for an electric vehicle for a second embodiment of the invention.

A second embodiment of a vehicular transportation system in accordance with the invention is illustrated in FIGS. 7 and 8. FIG. 7 illustrates control circuitry 238 for a power rail 216. Energization of a rail segment 220 is controlled through a Hall-effect switch 240, associated with each rail segment 220. Hall-effect switch 240 is a magnetically operated solid state switch. Hall-effect switches, having no mechanical contact assembly, are very long lasting. The output of Hall-effect switch 240 is applied to the inverting inputs of an operational amplifier 246. Operational amplifier 246 has a non-inverting input connected to a node between resistor 244 and potentiometer 242, which are used to set a predetermined signal level for the non-inverting input allowing two state operation of amplifier 246 in response to Hall-effect switch 240.

The output state of operational amplifier 246 determines whether the rail segment 220 associated with the control circuitry 238 containing the operational amplifier is electrified. The output of operational amplifier 246 determines the signal through a coil 250. Changes in the signal through coil 250 in turn close and open a double pole, double throw switch 248. The "open state" (grounding rail segment 220(a)) of double pole, double throw switch 248 is shown in control circuitry 238(a), the closed state (electrifying rail segment 220(b)) is shown in control circuitry 238(b). The end edges of rail segments 220 may be canted as illustrated with reference to FIG. 1.

FIG. 8 is a block diagram schematic illustrating vehicle speed and trolley control for a vehicle used with power rail 216. The circuit is very similar to the circuit described in relation to FIG. 6. Only the differences between that circuit and the present one are described here. The differences relate to operation of a magnetic field generating coil 160, installed with each vehicle for activating Hall-effect switches 240, and to deletion of a signal generator 106. Field coil 160 is connected between power controller 105 and ground, and is activated in response to microprocessor 99 determining (1) that the trolley system is in connection with a SHERT system and (2) power is required by the vehicle. Field coil 160 generates a magnetic field for actuating Hall-effect switches 240. The positioning of field coil 160 on a vehicle will be controlled by the considerations relating to trolley positioning on the vehicle.

Instead of a Hall-effect device, other switches may by used including metal proximity sensors or magnetically operated switches which would open or close in the presence of the metal in the vehicle or a magnetic field generated by a magnetic device on the vehicle. For example, a reed switch or a magnetic inductive proximity sensor may be used.

Figure 9:
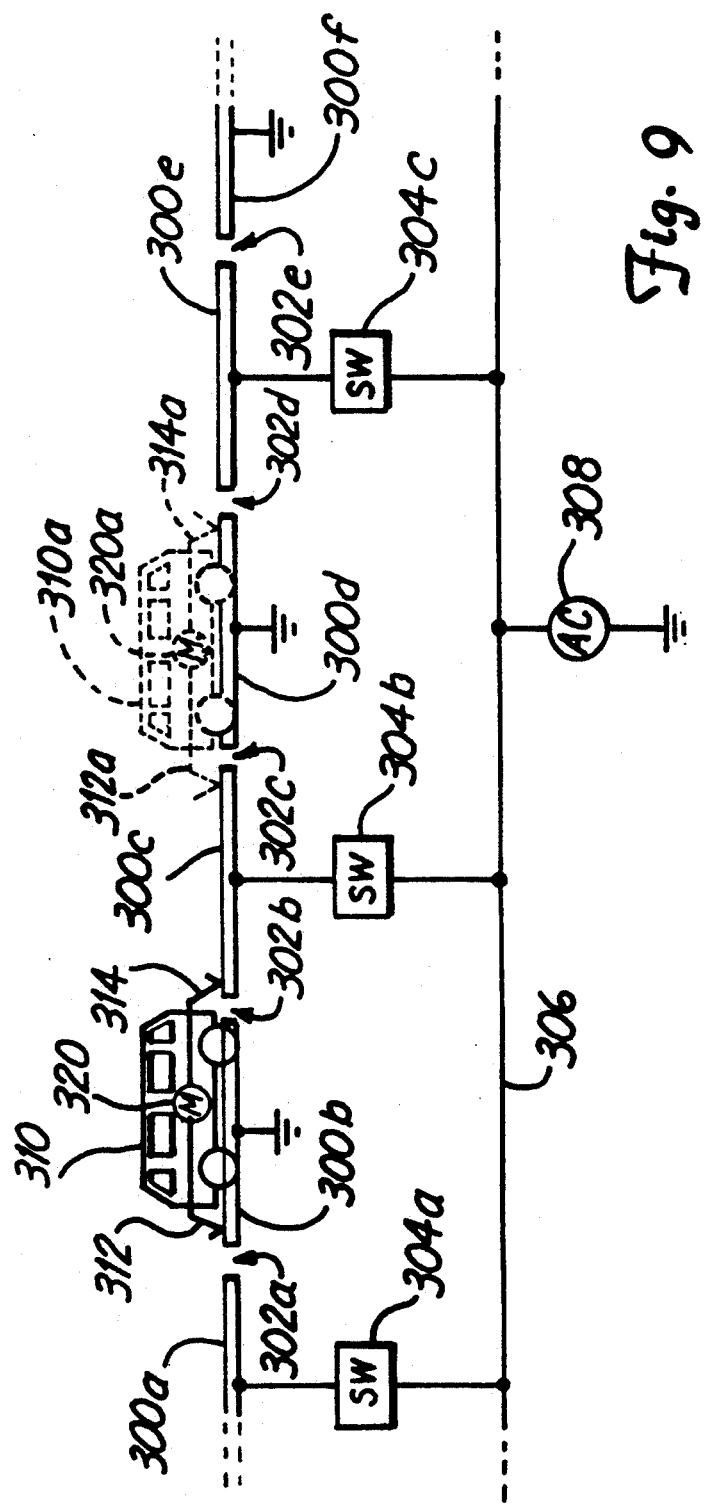
FIG. 9 is an alternative embodiment of the present invention.

In FIG. 9, an alternate embodiment is shown which is particularly useful when the power source is A-C. In FIG. 9, the sections of track 300a-300f are shown, arranged end-to-end along the direction of travel with spaces 302a-302e therebetween. Each alternate section 300a, 300c and 300e is connected through an associated switch 304a, 304b and 304c to a power bus 306 which in turn is connected to an alternating power source 308. A vehicle 310 having conductors in the form of brushes or trolleys 312 and 314 is shown between grounded section 300b and section 300c. Trolleys 312 and 314 are spaced so as to touch two adjacent sections but preferably not so far apart as to span any of the sections nor so close together as to have both trolleys touching the same section. A signal generator (not shown) in vehicle 310 will energize switch 304b when vehicle 310 is proximate thereto so that the A-C power from source 308 is applied from bus 306 through switch 304b, trolley 314, and an A-C motor 320 in vehicle 310, trolley 312 and section 300b to ground. Motor 320 drives the wheels of vehicle 310 which then moves to the right in FIG. 9 and as vehicle 310 continues to travel in this direction it will arrive at a position where vehicle 310a is shown in phantom. During this travel, trolley 314 will leave section 300c and pass over the space 302c to contact grounded section 300d while trolley 312 will leave grounded section 302b and pass over space 302b to contact section 300c. In the phantom position power is applied from bus 306 through switch 304b to section 300c, trolley 312a, A-C motor 320a, trolley 314a and section 300d to ground. Because an A-C source is being used, motor 320 continues to drive in the same direction in both positions so that vehicle 310 continues to move to the right. When vehicle 310 is moved to the right far enough to contact section 300e, switch 304c will close and switch 304b will open. The situation will then be the same as shown by the solid line position of vehicle 310 in FIG. 9 except that vehicle 310 will now be between sections 300d and 300e.

It is seen that with the embodiment of FIG. 9, all of the switches associated with grounding the rail sections have been eliminated since the alternate sections 300b, 300d and 300f are permanently grounded. Likewise, powered sections 300a, 300c and 300e etc. may be left open or "floating" when the vehicle 310 is not located proximate thereto and accordingly a simple on-off switch may be employed thus eliminating further switching operations.

The spaces 302a–302e are seen to be necessary in order to prevent trolleys 312 and 314 from touching two adjacent sections simultaneously and thus causing a short circuit.

If desired, the power source 308 and motor 320 in FIG. 9 may be D-C in which event, a circuit as will be described in connection with FIG. 11 may be used to assure that the motor 320 will always drive in the proper direction.

FIG. 10 shows yet another embodiment of the present invention which, in addition to transportation use, may find utility in connection with toys. In FIG. 10, a track 400, which may be constructed with side rails 402 and 404 to prevent vehicles from leaving the track, has a plurality of relatively wide conductive sections 410, 412, 414, 416, 418 and 420 separated by spaces 421, 423, 425, 427 and 429. A vehicle 430, having conductors or trolleys 432 and 434 thereon, is shown over space 423 with conductor 432 in contact with section 412 and conductor 434 in contact with section 414. Alternate sections 410, 414 and 418 are connected to a reference potential such as ground while the remaining sections 412, 416 and 420 are connected to the positive terminal of a D-C power source such as battery 440 in FIG. 10, the negative terminal of which is connected to the reference potential. Vehicle 430 contains a D-C motor 444 and a diode circuit 446, such as shown in FIG. 11, connected between trolleys 432 and 434.

In the position shown in FIG. 10, conventional current will flow from the positive terminal of battery 440 to section 412, trolley 432, motor 444 and diode circuit 446, trolley 434 and section 414 to ground. This causes the vehicle 430 to move to the right in FIG. 10 until trolley 432 leaves section 412 to contact section 414 and trolley 434 leaves section 414 to contact section 416. (Inertia will carry the trolleys over the nonconductive spaces 423 and 425 in both FIGS. 9 and 10). In the new position, current will flow from the positive terminal of battery 440 to section 416, trolley 434, diode circuit 446 and motor 444, trolley 432 and section 414 to ground. The current through motor 444 will be in the same direction in both cases because of the diode circuit 446 as seen in FIG. 11.

In FIG. 11, when trolley 432 is in contact with the positive side of battery 440, conventional current flows through a diode 450, motor 444 in an upward direction and a diode 452 to trolley 434 in contact with ground. When trolley 434 is in contact with the positive terminal of battery 440, conventional current will flow from the battery 440 to trolley 434, through a diode 454, motor 444 in, again, the upward direction, and through a diode 456 to trolley 432 in contact with ground. Thus the motor 444 will continue to drive vehicle 430 to the right. Of course, other methods of creating a unidirectional current flow through motor 430 will be apparent to those skilled in the art. Likewise, to cause the vehicles described in the above embodiments to run in reverse, any well known transmission gearing system may be employed or the vehicle may easily contain a reversing switch to cause current flow in the opposite direction.

Although the present invention has been described with reference to preferred embodiments, workers skilled in the art will recognize that changes may be made in form and detail without departing from the spirit and scope of the invention.

What is claimed is:

1. An electric vehicle transportation system for use with a roadway comprising:
   a plurality of track sections positioned end-to-end along the direction of travel on the roadway with a predetermined space between adjacent sections, alternate sections being connected to a reference potential while each remaining section being connected to one side of one of a plurality of switches;
   a motor vehicle having first and second conductors extending from spaced positions on the vehicle in the direction of travel to contact two adjacent track sections;
   a source of power connected to the other side of the plurality of switches, each switch being operable by the vehicle when located proximate thereto to activate the switch so that its track section is connected to the source of power and power is applied through the first conductor, through the motor and through the second conductor to a track section at the reference potential to drive the vehicle.

2. Apparatus according to claim 1 wherein the source of power is A-C.

3. Apparatus according to claim 2 wherein all of the remaining track sections except the one that is connected to the source of power are switched to a floating condition.

4. Apparatus according to claim 1 wherein the source of power is D-C and the motor includes a current directing device operable to insure that the current flows through the motor in the same direction regardless of the polarity between the track sections which the conductors contact.

5. An electric vehicle transportation system for use on a roadway comprising:
   a plurality of spaced conductive sections positioned end to end along the roadway in the direction of travel on the roadway;
   means connecting alternate sections to a reference potential and the remaining sections to a D-C power source,
   a vehicle containing a motor and a pair of conductors connected to the motor, the conductors extending from the vehicle to contact the sections, the conductors being spaced in the direction of travel so that the contact is made with two adjacent sections on either side of one of the spaces, the width of the sections and the length of the conductors perpendicular to the direction of travel being chosen so that contact is made for all perpendicular positions of the vehicle while traveling on the roadway.

6. Apparatus according to claim 5 wherein a unidirectional current flow device is connected to the motor and the conductors to assure that current flows through the motor in the same direction regardless of the polarity applied to the conductors.

7. Apparatus according to claim 6 where in the unidirectional current flow device is a diode bridge.

8. Apparatus according to claim 5 further including side rails positioned on either side of the roadway to prevent the vehicle from leaving the roadway.

9. Apparatus according to claim 8 wherein the width of the sections is sufficient that the conductors will be in contact therewith even when the vehicle is in contact with either side rail.

* * * * *